UNITED STATES PATENT OFFICE.

EDWARD B. CUNNINGHAM AND FELIX C. THIELE, OF SUGARLAND, TEXAS.

SYNTHETIC ADHESIVE GUM.

SPECIFICATION forming part of Letters Patent No. 637,090, dated November 14, 1899.

Application filed June 17, 1899. Serial No. 720,909. (No specimens.)

*To all whom it may concern:*

Be it known that we, EDWARD B. CUNNINGHAM and FELIX C. THIELE, citizens of the United States, residing at Sugarland, in the county of Fort Bend, State of Texas, have invented certain new and useful Improvements in the Production of Synthetic Adhesive Gums, of which the following is a specification.

This invention relates to synthetic adhesive gums, and particularly to such a gum produced from cellulose.

The invention has for its object to synthetically produce an adhesive gum having the characteristics of gum-arabic by the molecular transformation of cellulose sulfates.

The invention has for a further object to produce an adhesive gum capable of very economical manufacture from such cellulose products as the lint removed from cotton-seed, which gum is capable of use in the mechanical arts, where the use of a higher-priced product has heretofore been necessary—such, for instance, as thickening colors, preparing ink, stiffening hats, in tobacco and cigar industries, for mucilage, preparing water-colors, emulsions, varnishes, and numerous other articles.

The gum hereinbefore referred to may be produced from any substance consisting of or yielding by treatment cellulose, such as wood, cotton, cornstalks, leaves, bagasse, &c.; but as an illustration of the process involved for the very economical manufacture of such a gum we will describe its production from the cellulose or lint obtained in a process of delinting cotton-seed, particularly in connection with the process described in our pending application for delinting cotton-seed filed of even date herewith. In the application referred to we have described the delinting as produced by a treatment of the raw seed with a mixture of sulfuric acid and pyrosulfuric acid or a pyrosulfate, boric acid, or passing an electric current through the mixture of sufficient strength to produce a pyrosulfuric acid from the commercial acid employed, the sulfuric acid having a specific gravity not less than 1.568 or more than 1.842 and at a temperature not exceeding 40° Fahrenheit. The result of this process is to effectually remove the lint from the seed and obtain it in a form very valuable in commerce.

To demonstrate the chemical changes which take place when cellulose is treated with the above acid mixture, we give as an example its behavior toward a mixture of pyrosulfate of potash and sulfuric acid:

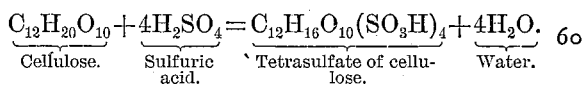

As will be seen, the cellulose is first changed by the sulfuric acid into cellulose sulfate, besides water being formed; but as the pyrosulfate of potash is present in the same solution a second reaction takes place immediately according to the following equation:

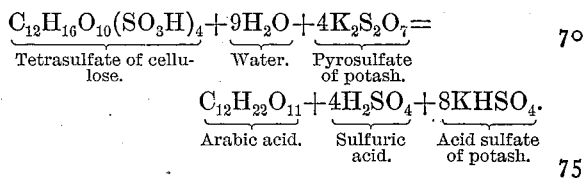

The tetrasulfate of cellulose gives up its sulfuryl groups, the remaining cellulose radicals uniting with water and forming under molecular transformation arabic acid, while the pyrosulfate of potash is formed into acid sulfate of potash insoluble in the obtained acid solution. The acid solution is drained off of the acid sulfate of potash and neutralized with chalk or lime, filtered off of the gypsum formed, made slightly alkaline by the addition of a little more lime, and evaporated to a thin syrupy consistency. Some more gypsum is thrown down at this stage, which is filtered off again, and the remaining liquor is evaporated to dryness, preferably in a vacuum, as the temperature should be kept as low as possible at this stage.

In the foregoing experiment the proportions, by weight, of material used were substantially as follows: 3.6 parts of commercial sulfuric acid, density 66° Baumé, 2.4 parts of dry cotton, and 0.15 parts of pyrosulfate of potash.

The obtained gum or arabic acid being in substantially flake form is not in a pure state, however, but contains gallisine, glucose, traces of dextrine, and analogous compounds.

The gum in this state is capable of use in the various mechanical arts and for numerous purposes; but if it be desired to free it from these by-products it may be dissolved in sulfuric acid of about 50° Baumé, in which it remains until the evolution of sulfurous acid ceases. This evolution of sulfurous acid is caused by the decomposition of the by-products, especially the glucose, contained in the crude gum, and the reaction is carried out at ordinary temperature, so that it does not affect the arabic acid. After diluting the mixture with water, neutralizing the liquor with chalk or caustic lime, filtering, and evaporating to dryness the remaining gum forms a yellowish-colored amorphous adhesive substance, showing all characteristics of arabic acid, especially its levulo-rotatory power on the polarized ray of light, its characteristic copper-salt, &c. The gum can be used for all purposes to which gum arabic, cerasin, dextrine, gum-tragacanthum, &c., have heretofore been employed.

While the treatment of the cellulose by the above acid mixture has been described in connection with the delinting process, it is obvious that such treatment may be applied to cellulose of any origin.

It is obvious that changes may be made in the details of the foregoing process, the reagents used, and the mechanical devices employed without departing from the spirit of this invention.

Having described our invention, what we claim as new, and desire to secure by Letters Patent, is—

1. The within-described soluble adhesive gum $C_{12}H_{22}O_{11}$ being amorphous, in substantially flake form, and containing traces of gallisine, glucose, dextrine and analogous compounds; substantially as specified.

2. A water-soluble adhesive gum substantially $C_{12}H_{22}O_{11}$, amorphous in form and synthetically produced from cellulose products; substantially as specified.

3. A water-soluble adhesive gum substantially $C_{12}H_{22}O_{11}$, amorphous in form and synthetically produced from the delinting residuum of cotton-seed; substantially as specified.

In testimony whereof we affix our signatures in presence of two witnesses.

EDWARD B. CUNNINGHAM.
FELIX C. THIELE.

Witnesses:
FRANK J. BREELEN,
JNO. P. KETTERSON.